OR 3,639,032

United States
Haines

[15] 3,639,032
[45] Feb. 1, 1972

[54] TECHNIQUES FOR HOLOGRAM DATA REDUCTION

[72] Inventor: Kenneth A. Haines, Runnymede, Del.

[73] Assignee: The Battelle Development Corporation, Columbus, Ohio

[22] Filed: Mar. 21, 1969

[21] Appl. No.: 809,171

Related U.S. Application Data

[63] Continuation-in-part of Ser. No. 730,337, May 20, 1968, abandoned, which is a continuation-in-part of Ser. No. 649,337, June 27, 1967, abandoned.

[52] U.S. Cl. ............................................. 350/3.5, 161/3.5
[51] Int. Cl. ..................................................... G02b 27/00
[58] Field of Search ........................... 350/3.5, 162; 96/27 H

[56] References Cited

OTHER PUBLICATIONS

Leith et al., SPIE Journal, Vol. 4, pp. 3–6, Oct–Nov. 1965

Kogelnik, Bell System Technical Journal, Vol. 44, pp. 2,451–2,455 Dec. 1965

Rotz et al., Applied Physics Letters, Vol. 8, No. 6, pp. 146–148, Mar. 1966

Konstantinov et al., Soviet Physics-Technical Physics, Vol. 11, No. 9, pp. 1,279–1,281, Mar. 1967

*Primary Examiner*—David Schonberg
*Assistant Examiner*—Ronald J. Stern
*Attorney*—Woodcock, Washburn, Kurtz & Mackiewicz

[57] ABSTRACT

A technique for reducing the space-bandwidth product, recorded at the hologram plane in the method of holography in which the object wave front is dispersed before reaching the hologram plane such that the space-spatial frequency product of interference fringes recorded at the hologram plane is reduced without reducing the angle of viewing the image upon reconstruction.

30 Claims, 14 Drawing Figures

TECHNIQUES FOR HOLOGRAM DATA REDUCTION

RELATED APPLICATIONS

This application is a continuation-in-part of copending application, Ser. No. 730,337 filed May 20, 1968, now abandoned, which is a continuation-in-part of copending application, Ser. No. 649,337, filed June 27, 1967, now abandoned.

BACKGROUND OF THE INVENTION

This invention relates to the field of holography and more specifically relates to a method for reducing the bandwidth recorded by a hologram.

In a specific method of off-axis holography, a hologram is produced by recording the interference pattern between the object bearing wave front or object beam and a reference beam which is directed to the hologram at an angle to the object beam and which is coherent therewith. An image of the original object is reconstructed by illuminating the hologram with coherent radiation directed to the hologram at the same angle as the original reference beam. The hologram diffracts the illuminating beam into several diffracted orders and a real and a virtual image of the original object are carried in two first order diffracted beams.

The spatial frequency recorded by the hologram sometimes varies over a large bandwidth, very often to the point of imposing exceptionally high resolution requirements on the hologram detector. In holographic communication systems, now contemplated, involving the transmission of holographic data, enormous time-bandwidth products, i.e., the amount of information necessary to be transmitted in a given amount of time, would be required. In a communication system such as television, in which a two-dimensional information display is scanned and transmitted in a given amount of time, it has been estimated that the bandwidth necessary to transmit holographic data displayed on the television screen would be greater than present television bandwidth requirements by a factor of $10^4$. For these reasons, it is desirable to devise techniques whereby the time-bandwidth products (actually space-spatial frequency products in systems such as television) are significantly reduced. However, any reduction in this product, which represents the total amount of data, preferably should not be accompanied by a reduction in the viewing angle of the holographic image.

Similarly, in holographic motion picture applications, the hologram size is the aperture through which the image is viewed. It is desirable to reduce the hologram size without reducing the screen size.

It is an object of this invention to devise a technique whereby the data recorded at the hologram plane, be it off-axis or other type of hologram, is significantly reduced.

It is another object of this invention to devise a method of producing holograms of reduced data from which images may be reconstructed with no loss in viewing angle.

It is a further object of this invention to devise a method of producing holograms of reduced data from which an orthoscopic image may be reconstructed with no loss in viewing angle.

SUMMARY OF THE INVENTION

The objects of this invention are obtained in one form by interposing a dispersion medium in the path of the object beam prior to its impinging on the hologram and collecting at the hologram plane only certain dispersed rays of the object beam over a defined area to record a hologram with a reduced space-spatial frequency product. By reconstructing the image from the hologram in the reconstruction process with the dispersion medium in its original position, the image of the object can be viewed with no loss in viewing angle if the dispersion medium is chosen to have adequate dispersive characteristics for a particular hologram size and distance from the dispersion medium.

Furthermore, if the rate of change of the relative light phase shifting properties across the face of the dispersion medium is a constant over small but specified distances, background noise will not be increased by a reduction of the space-spatial frequency product of the hologram according to techniques of the present invention. The image reconstructed according to these techniques is pseudoscopic and real and a conversion method is required when an orthoscopic image is desired.

While the invention is defined in the appended claims, the underlying principles of the invention, together with specific embodiments thereof, may be better understood with reference to the following detailed description taken in conjunction with the following drawings. For a more quantitative description of the hologram data reduction aspect of the present invention, reference should be had to the *Proceedings of the IEEE*, Aug. 1967, pp. 1,512–1,513, and to *Applied Optics*, June 1968, Vol. 7, No. 6, pp. 1,185–1,189.

BRIEF DESCRIPTION OF THE DRAWINGS

FIG. 4b illustrates a method of reconstructing an image of an object from a hologram made in accordance with FIG. 4a;

FIG. 5b illustrates a method of reconstructing an image of an object from a hologram made in accordance with FIG. 5a;

FIG. 8 shows an additional holographic step for an orthoscopic reconstructed image from a hologram made according to the teachings of FIG. 4a;

FIG. 9 shows one technique for reconstructing an orthoscopic image from a hologram made according to FIG. 4a;

FIG. 10b illustrates a technique for reconstructing an orthoscopic image from a hologram made according to the method shown in FIG. 10a.

DETAILED DESCRIPTION OF PREFERRED EMBODIMENTS

Figure 1:
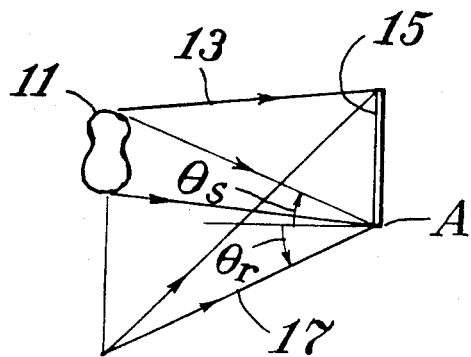
FIG. 1 depicts the usual off-axis configuration in the conventional method of making holograms.

Referring to FIG. 1, there is depicted the conventional method of off-axis holography in which an object 11 is illuminated with coherent radiation (not shown) such that it reflects or diffracts an object modified bearing wave front or object beam 13 (or information carrying beam) toward a hologram detector surface 15 which may comprise a sheet of ordinary photographic film. The hologram is produced by directing a reference beam 17 to the holographic detector surface 15 at an angle $\theta_r$ with the normal to the hologram 15. The hologram 15 records the interference pattern resulting from interference between the object modified beam 13 and the reference beam 17 and, when developed, can be utilized to reconstruct an image of the object 11 by illuminating it with radiation directed at the same angle $\theta_r$ in FIG. 1.

It should be noted that basic wave front reconstruction holography produces a pair of images of an object. One is an actual image of the object which appears to the observer as if he was viewing the object itself, herein referred to as an orthoscopic image. The other image is a pseudoscopic one, wherein near points of the object appear to be farther from the observer than appear far points of the object.

The minimum separation between the interference fringes recorded at the hologram plane depends upon the angle between the reference and the objects beams and the wavelength $\lambda$ of the radiation. The points on the hologram 15 which records the highest spatial frequency (minimum separation) of interference fringes is that point in which the angle between an object beam ray and a reference beam ray is a maximum. In FIG. 1 this would occur at the extreme position of the hologram 15 at the point marked A, and the angle between an object beam ray and a reference beam ray at that point would equal $\theta_r + \theta_s$. The spatial frequency $f$ of interference fringes recorded by the hologram is given by the expression:

$$f = (\sin \theta_s + \sin \theta_r)/\lambda \quad (1)$$

Figure 2:
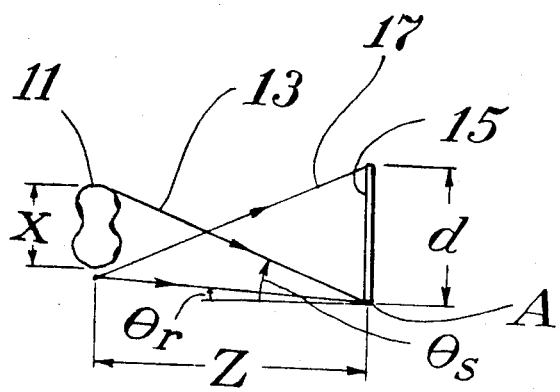
FIG. 2 depicts a conventional method of minimizing the spatial frequency recorded on a hologram.

In order to minimize the spatial frequency recorded by the hologram 15, the reference beam 17 can be oriented so that it just grazes the object as depicted in FIG. 2. In this case, the expression for the spatial frequency recorded by the hologram 15 is:

$$f = (\sin \theta_s - \sin \theta_r)/\lambda \quad (2)$$

In a system wherein an object 11 of height $x$ and a hologram 15 of height $d$ are separated at a distance $Z$ from each other with their respective center lines coinciding, the quantities indicated in Equation (2) are given by:

$$\sin \theta_s = \frac{1/2\ (x+d)}{\left[Z^2 + \left(\frac{x+d}{2}\right)^2\right]^{1/2}} \cong \frac{1/2\ (x+d)}{Z} \quad (3)$$

$$\sin \theta_r = \frac{1/2\ (x+d)}{\left[Z^2 + \left(\frac{d-x}{2}\right)^2\right]^{1/2}} \cong \frac{1/2\ (d-x)}{Z} \quad (4)$$

where $Z >> d + x$.

Substituting Equations (3) and (4) into Equation (2) the expression for the maximum spatial frequency $f_1$ recorded by hologram 15 is given:

$$f_1 = x/\lambda Z \quad (5)$$

Equation (5), giving the maximum spatial frequency recorded by the hologram, is sometimes referred to as the required bandwidth and it is this factor when multiplied by the extent of the hologram $d$ which is desired to be reduced. In reducing this factor, however, it is not desirable to reduce the viewing angle or the field of view of the object 11 as seen by the hologram 15. The configuration of FIG. 2, wherein the reference beam angle is made as small as the particular system utilized permits, is the preferred configuration to be used in conjunction with the present invention to be described.

Figure 3:
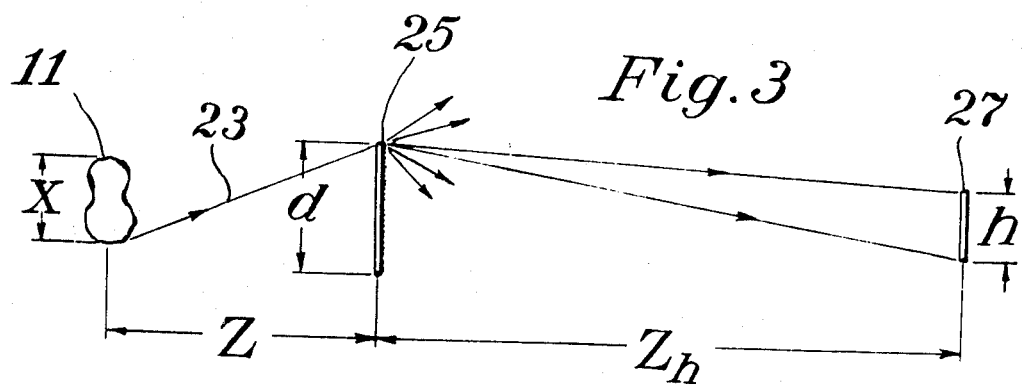
FIG. 3 illustrates a basic principle of the present invention.

The basic principle underlying the present invention is diagrammatically illustrated in FIG. 3. In FIG. 3, an object 11 of height $x$ is illuminated with coherent radiation (not shown) so that an object modified beam ray 23 strikes dispersion medium 25 at the extreme upper point thereof, thereby causing the ray 23 to be scattered at several different angles into a dispersed object modified or dispersed information carrying beam. A hologram detector surface 27 of height $h$ is placed at a distance $Z_h$ from the dispersion medium 25 so that it intercepts only a small fraction of the scattered rays, thus containing only lower spatial frequencies or being of a much smaller size than the hologram of FIG. 2. The dispersion medium 25 is of a height $d$ and is spaced from the object at a distance $Z$ so that it subtends the same viewing angle as did the hologram 15 in FIG. 2. FIG. 3 thus illustrates the basic principle of this invention, namely, that an object modified beam ray 23, which would ordinarily produce very high space-spatial frequencies if a hologram of height $d$ were positioned where the dispersion medium 25 is placed, is converted into several dispersed object modified beam rays only a few of which are utilized to produce the hologram.

The dispersion medium 25 may be any type of dispersive element, such as ground glass or a rough surfaced mirror which scatters light at a large number of angles. It may be a medium which is quite thick or it may comprise several composite planes. Detailed characteristics of the dispersion medium for certain defined results will be discussed hereinafter.

Figure 4A:
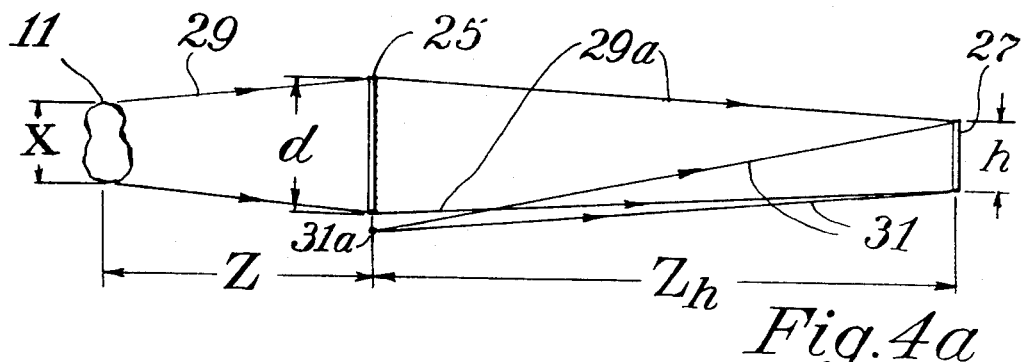
FIG. 4a illustrates one method of making a hologram of reduced spatial frequency according to the present invention.

The principle underlying this invention is illustrated in one embodiment in FIG. 4a, wherein the construction of a hologram of reduced bandwidth, and therefore reduced space-spatial bandwidth, is carried out. In FIG. 4a an object modified beam 29; is reflected or diffracted from the object 11 and is intercepted at a large viewing angle by the dispersion plane 25 spaced a distance $Z$ from the object and having a height $d$. A hologram 27 of height $h$ is spaced at a very large distance $Z_h$ as compared to $Z$ so that only those rays of a dispersed object modified or information carrying beam 29a which will produce lower spatial frequencies are collected by the hologram 27. A reference beam 31 is directed to the hologram 27 from a point position 31a located very near the dispersion medium 25. In the configuration of FIG. 4a, the elements are oriented on coincident axes, thereby simplifying the expression for the spatial frequencies at the hologram 27 to:

$$f_2 = d/\lambda Z_h \quad (6)$$

Figure 4B:
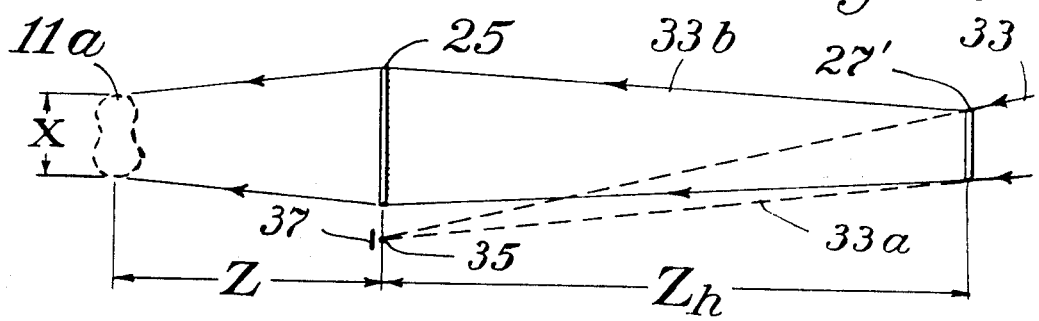

One method of reconstruction of an image of the object 11 from the hologram 27 made in accordance with FIG. 4a is depicted in FIG. 4b, wherein an illuminating beam 33, which is the complex conjugate (opposite curvature) of the reference beam 31 in FIG. 4a is directed to the developed hologram 27'. Since the illuminating beam 33 is the complex conjugate of the reference beam 31, the undiffracted beam 33a will be focused to a point 35 in the same relative position as the point source 31a in FIG. 4a and may be blocked by an appropriate filter stop 37. A first order diffracted beam 33b (a replica of the dispersed object modified beam 29a) carrying an image of the object 11 is directed to be intercepted by the dispersion medium 25 positioned at the same distance $Z_h$ from the hologram 27'. The dispersion medium 25 disperses on the wave front 33b in a similar manner as it dispersed the object bearing wave front 29 in FIG. 4a, such that a real image 11a is reconstructed in a wave front replica of the object modified beam recorded at a distance $Z$ from the dispersion medium 25. It is apparent that the viewing angle of the image 11a is the same as in the construction process of FIG. 4a.

In comparing the method of producing a hologram according to the present invention with the previous method illustrated in FIGS. 1 and 2, it is appropriate to compare the space-spatial frequency products of the two methods. In the conventional method of FIG. 2, the space-spatial frequency product ($f_1$ times $d$) is given by the following expression:

$$f_1 d = dx/\lambda Z \quad (7)$$

and the space-spatial frequency product ($f_2$ times $h$) according to the embodiments of FIGS. 4a and 4b is given by the expression:

$$f_2 h = hd/\lambda Z_h \quad (8)$$

The primary goal of the present invention is to make the space-spatial frequency product $f_2 h$ of the data reduced hologram 27 less than the space-spatial frequency product $f_1 d$ of the ordinary hologram 15. By use of Equations 7 and 8, this may be expressed, after elimination of $\lambda$ from each term, as follows:

$$(d/Z_h)h < (x/Z)d \quad (8a)$$

From Equation 8a it may be noted that data reduction according to this invention is accomplished when the maximum angle between any of the dispersed rays at some point on the detector 27 ($\cong d/Z_h$, for a small ratio) multiplied by a dimension $h$ of the detector 27 is less than a maximum angle between any of the information carrying rays at some point on the dispersing surface 25 ($\cong x/Z$, for a small ratio) multiplied by a dimension $d$ of the dispersing surface 25.

The space-spatial frequency reduction factor, R, is defined as the ratio of the space-spatial frequency products of the two methods and is given by the expression:

$$R = xZ_h/hZ \quad (9)$$

An examination of the expression of Equation (9) reveals that the reduction factor $R$ can be made large by several orders of magnitude simply by increasing the distance $Z_h$ between the dispersion medium and the hologram and by decreasing the distance $Z$ between the object and the dispersion medium. It is not necessary to position the hologram at a great distance from the dispersion medium in order to reduce space-spatial frequency products when the size of the hologram is small, the ratio of relative sizes of the object and the hologram is small and the space-spatial frequency product is reduced.

Since the hologram 27 does not gather all of the information transmitted from the dispersion medium 25, some noise and/or loss of resolution can be expected to be incurred. Specifically, the smaller the dimension $h$ of the hologram or, conversely, the greater the distance $Z_h$ between the hologram and the dispersion medium, the greater will be the noise and/or the loss of resolution in the reconstructed image 11a. In many instances, however, it is much more desirable to sacrifice resolution and/or incur a higher noise level in order to obtain a wide viewing angle at relatively low spatial frequencies.

Figure 5A:
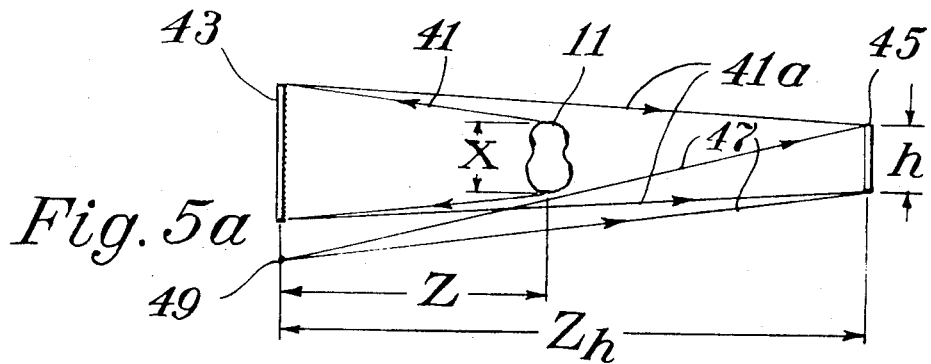
FIG. 5a illustrates another embodiment of the method of this invention for making holograms according to the present invention.
Figure 5B:
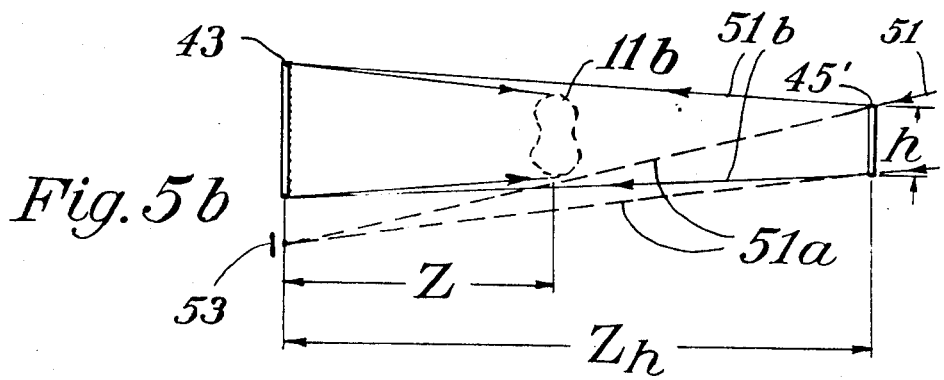

An alternative embodiment of the present invention is illustrated in FIGS. 5a and 5b, in which a reflective dispersion medium 43 has been substituted for the transmitting dispersion medium 25 utilized in the method of FIGS. 4a and 4b. Referring to FIG. 5a, an object modified beam 41 illuminates a reflective dispersion mirror 43 at a relatively large viewing angle as seen by the spacing distance $Z$ between the two, such that reflected dispersed object modified beam rays 41a which would produce relatively low spatial frequencies are reflected back and collected by a hologram detector surface 45 of height $h$ positioned at a distance $Z_h$ from the dispersion mirror 43. A reference beam 47 emanating from a point source 49 illuminates the hologram detector surface, thereby creating the interference pattern necessary to produce the hologram.

In FIG. 5b an illuminating beam 51, which is the complex conjugate of the reference beam 47, is directed to the developed hologram 45' such that an image bearing wave front 51b (a replica of the dispersed object modified beam 41a) is directed to the dispersion medium 43 spaced at the distance $Z_h$ from the hologram 45'. The dispersion medium 43 reflects a real image bearing wave front (a replica of the object modified beam 41) to a position spaced at a distance $Z$ therefrom and at this position the real conjugate image 11b of the object 11 is reconstructed. The undiffracted illuminating beam 51a may be blocked by filter stop 53 in a manner similar to that of FIG. 4b. Although the methods of FIGS. 5a and 5b should produce the same results as that of FIGS. 4a and 4b, in practice, the methods of FIGS. 5a and 5b may be preferable, inasmuch as a reflective dispersion medium of the desired characteristics may be more readily obtained than with a transmissive dispersion medium.

It should be noted that the methods of FIGS. 4a, 4b, 5a and 5b find application to large screen movies where the dispersion medium 25 or 43 corresponds to presently used movie screens. To reconstruct a motion picture, successive hologram frames are projected at a rate to give the image of the object 11b or 11a smooth motion, similar to presently used two-dimensional movies.

Figure 6:
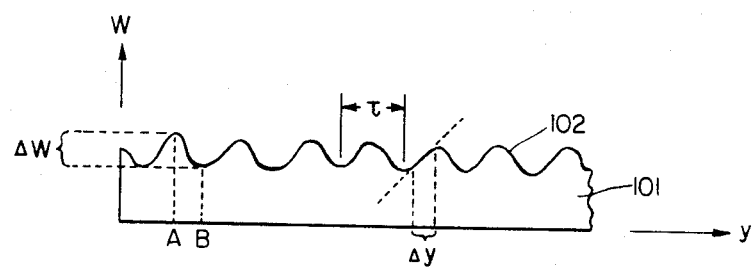
FIG. 6 shows an enlarged cross section of a portion of a typical plate which serves as a dispersive medium used as an example.

It has been discovered that there is a definite relationship between the characteristics of the dispersion medium utilized and the quality and the characteristics of the reconstructed image. FIG. 6 illustrates in cross section a typical dispersion medium of the transmissive type but it should be understood that the principles hereinafter discussed are equally applicable to dispersion mediums of the reflective type. Rays of a light wave front striking a dispersion medium 101 having an irregular surface 102 must be shifted in phase as they emerge from the medium relative to other rays along the incident wave front. This is accomplished by making the medium 101 of material such as glass in which light travels slower than in the surrounding air and which has a periodic, random or pseudorandom variation in its surface 102.

Consider a ray passing through the plate 101 at a point B where the thickness of the material is at a minimum. The phase of this ray will be shifted a minimum amount while a ray passing through the plate 101 at a point A will encounter a larger relative phase change because of the greater material thickness at that point. Assigning a coordinate system wherein $y$ is the distance across the dispersion plate and the distance $w$ is the thickness of this plate, the relative phase difference $\theta$ between the two rays at the positions A and B is given by $$\phi = \frac{2\pi \Delta w (\eta - 1)}{\lambda} \qquad (10)$$

where $\Delta w$ is the relative height of the surface irregularities and $\eta$ is the refractive index of the dispersive material 101.

There must be a sufficient variety of slopes in the surface 102 of the dispersion medium 101 to diffract enough light through a large angle in order to maintain a desired viewing angle of an object upon image reconstruction.

Figure 7:
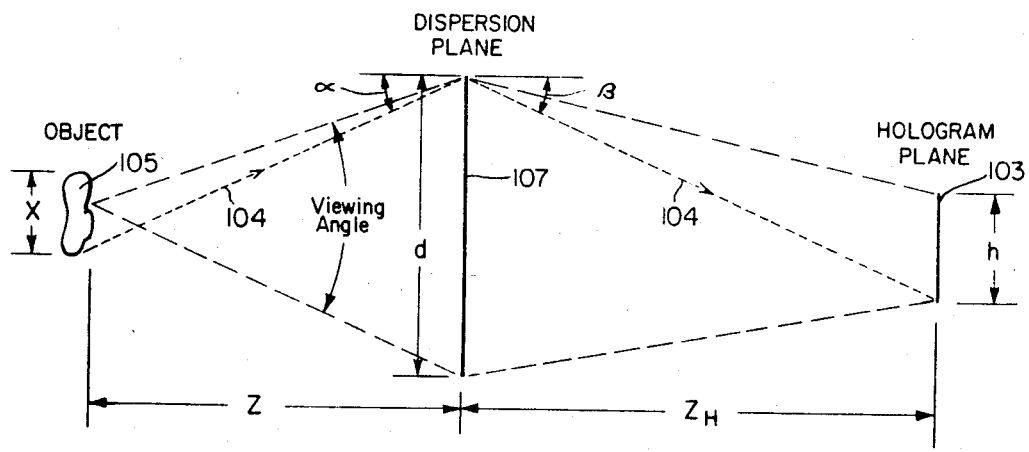
FIG. 7 illustrates the viewing angle resulting from the techniques of this invention.

Referring to FIG. 7, a schematic diagram for constructing a hologram 103 of an object 105 by using a dispersion medium 107 according to the techniques of this invention as previously described, is shown to illustrate the required refracting properties of the dispersion medium 107. In order to produce an image with a "viewing angle" which is dependent only upon the dimension $d$ and $Z$ as hereinabove described, the dispersion medium 107 must be able to receive light ray 104 from one extreme of the object 105 and refract it as its edges onto an opposite extremity of the hologram 103. For the schematic representation of FIG. 7, the maximum bending power of the dispersion medium 107 must be sufficient to bend a light ray a maximum angle $\alpha+\beta$. This maximum angle is dependent upon the sizes of all elements used and distances therebetween in constructing a hologram according to the present invention. To obtain a dispersion medium which satisfies this and further requirements, it has been found preferable to examine a group of various previously manufactured mediums instead of attempting to manufacture such a medium from the beginning.

It has been found that the shape of a random surface 102 of the dispersion medium 101 in FIG. 6 may be generally determined mathematically by the following expression:

$$\frac{\sigma_\phi}{K} = \left| \frac{1/2\, x + 1/2\, d}{Z} \right| + \left| \frac{d}{2\, Z_h} \right| \qquad (11)$$

where $\sigma_\phi$ is the standard deviation of a statistical sampling of the rate of change of relative phase across the face of a dispersion medium, $K=2\pi/\lambda$ and the other quantities are various distances shown in FIG. 7. If this relationship is satisfied, the desired viewing angle as determined by choosing the quantities $d$ and $Z$ is maintained in the reconstructed image.

The use of a dispersion plate, as hereinbefore mentioned, carries with its advantage of reducing the space-spatial frequency product without a loss of viewing angle an attendant loss in resolution or increase in background noise in the reconstructed image, or both. For visual display such as television and movies, the resolution in a holographic image far exceeds the minimum requirements for commercial acceptability. Therefore, it is desirable in these certain circumstances, to achieve the required data reduction by reducing resolution rather than increasing background noise or reducing the viewing angle of the reconstructed image. By placing an additional requirement upon the characteristics of the dispersion plate 101, it has been discovered that a low background noise level may be maintained as the space-spatial frequency product is decreased if the rate of change of the relative phase (or slope of the undulations forming the surface 102) is approximately constant over a small distance $\Delta y$ as shown in FIG. 6. The distance $\Delta y$ is related to the geometrical arrangement of the hologram construction process in that it equals the resolution element size of the reconstructed wave front and can be determined by the following expression:

$$\Delta y \approx \lambda Z_h / h \qquad (12)$$

where the dimensions of FIG. 7 apply. A dispersion plate meeting this additional requirement might otherwise have a random relative phase function across its face.

To examine a dispersion medium which is a candidate for use in a holographic construction application where resolution is sacrificed for low noise, it has been found that an observer with the use of a microscope may satisfy the requirement of a constant slope over $\Delta y$ by choosing a medium with a varying surface 102 that has an average period $\tau$ equal to at least several times the resolution element size $\Delta y$. It has been found that as $\tau$ increases, the resulting image background noise is reduced so $\tau$ is made as large as possible for a given resolution, but not too large to result in a spotty image.

It should also be noted that for certain applications, such as holographic data storage, it may be desired to have as high a resolution as possible for a given hologram construction geometry. This may be accomplished by selecting a very small τ and the increased resolution will be obtained at the expense of increased noise.

While examining a candidate dispersion plate under a microscope, it should also be observed whether any holes or pits in the varying surface of the medium exist. If so, this dispersion medium should be rejected unless a significant noise level can be tolerated.

Any variations in the dispersion medium characteristics as a function of position along its surface have not been considered, but it should be recognized that for certain applications of this invention, such variations of the transmission coefficient or of the average angle through which light is dispersed, or both, may be desired. Such variations may be accomplished by design of a single dispersion plate or may result from several elements in tandem.

Images reconstructed according to the techniques heretofore described are pseudoscopic. Although such an image is useful in many applications, it is sometimes desirable to reconstruct an orthoscopic image of the object. One technique for reconstructing an orthoscopic image includes using a pseudoscopic image of the object field in place of the object which is the subject of the hologram construction as described hereinabove for carrying out the method of the present invention.

Figure 8:
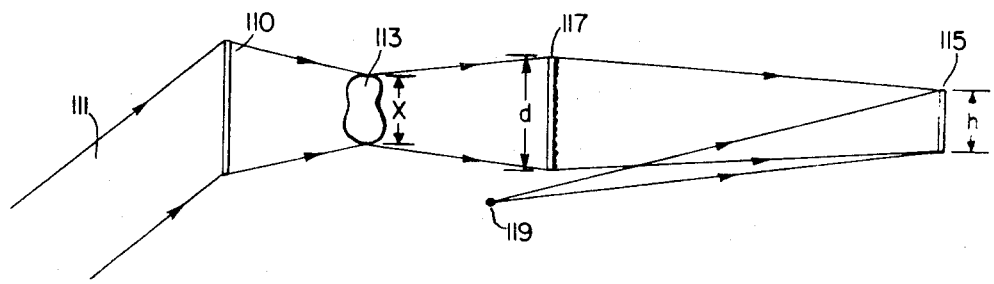

Referring to FIG. 8, an ordinary hologram 110 of an object is constructed according to basic holographic techniques, wherein an image is reconstructed by illumination with a light beam 111. As is well known, a hologram produces pseudoscopic and orthoscopic images which may be individually viewed. A pseudoscopic image 113 of an object field is reconstructed from the hologram 110 and is then used as the object for constructing a hologram 115 according to the techniques of the present invention as described with reference to FIG. 4a, wherein the use of a dispersion medium 117 and a reference beam light source 119 are described. Images from the hologram 115 are reconstructed according to the techniques described with reference to FIG. 4b and an orthoscopic image will result instead of the pseudoscopic image hereinbefore described.

The image 113 of the hologram 110 may be allowed to come to focus on either side of the dispersion medium 117 so that the reconstructed image from the hologram 115 may be either virtual or real. In this technique, the pseudoscopic image 113 that is used as an object for constructing the hologram 115 must have an angle of view that is as large as that angle of view desired in the final reconstructed orthoscopic image. This requires a large hologram 110 in order to achieve wide viewing angles.

Figure 9:
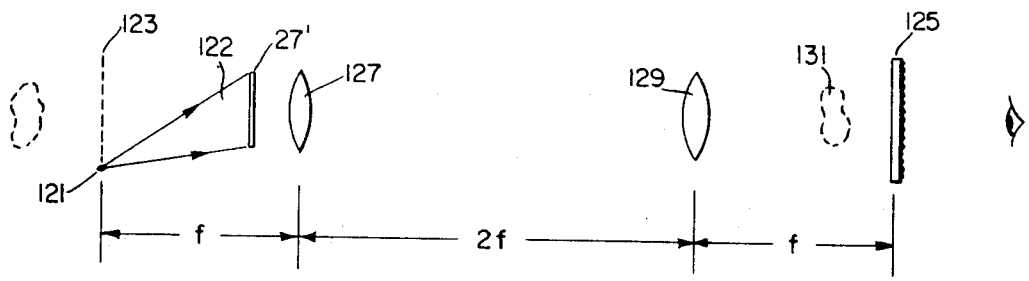

Another method for applying the techniques of the present invention to result in an orthoscopic reconstructed image wherein a hologram 27' made according to the configuration of FIG. 4a has an image reconstructed according to the method shown in FIG. 9. The hologram 27' is illuminated with a light beam from a source 121 in the same manner as the hologram was illuminated by the reference source 31a during its construction. This produces an image carrying wave front leaving the hologram which contains a virtual and orthoscopic image 123 of the dispersive medium 25. The reconstructing radiation beam 122 preferably has the same degree of curvature as the reference beam 31 in order to produce an image 123 which is of the same size as the dispersive medium 25. An optical imaging system is positioned in front of the hologram 27' to bring the virtual and orthoscopic image 123 of the dispersive medium into a real image at a plane in space so that a second dispersive medium 125 may be located coincident thereon. The optical system shown here is a unit magnification telescope wherein two lenses 127 and 129 which each have a focal length $f$ are positioned as shown in FIG. 9. The dispersive medium 125 is not the same medium used in constructing the hologram, as in the methods previously described, but must be a phase conjugate of the dispersive medium 25 used in constructing the hologram 27' according to FIG. 4a. This conjugate of the dispersive medium can be produced, for example, by taking the imprint of the dispersive medium 25.

The reconstructing method according to FIG. 9 results in an orthoscopic image 131 of the object 11 which will appear to the observer to be behind the dispersive medium 125. This technique results in an image 131 being unaberrated and undistorted except, of course, by what may be introduced by the optical elements in the system.

Figure 10A:
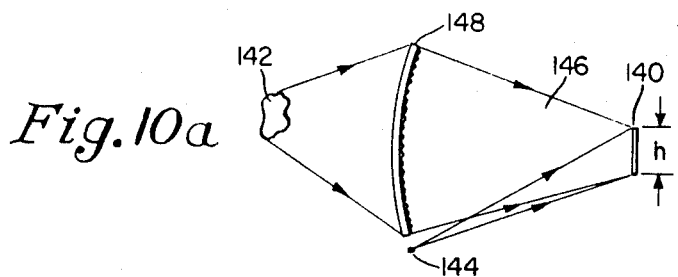
FIG. 10a illustrates a method for making a hologram from which an orthoscopic image may be reconstructed.
Figure 10B:
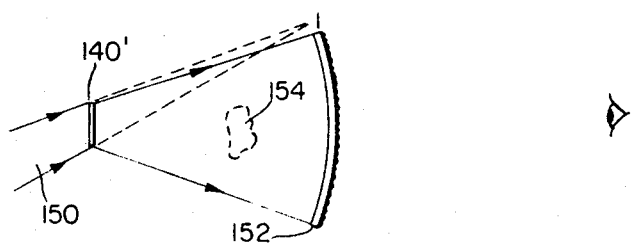

A third method for producing an orthoscopic image is shown in FIGS. 10a and 10b. A hologram 140 is constructed as shown in FIG. 10a wherein an illuminated object 142 is the holographic subject. A source 144 produces a reference beam for interference with an object bearing beam 146. A dispersive medium 148 which is placed between the object and the hologram is curved with the center of curvature approximately in the middle of the hologram 140. After development, the hologram 140' is used to reconstruct an image 154 as illustrated in FIG. 10b. A reconstructing light beam 50 which is the conjugate of the reference beam used to construct the hologram 140 according to FIG. 10a, illuminates the hologram 140' which produces an image of the dispersive medium 148 at a surface in space wherein a second dispersive medium 152 is placed to be coincident with this image. The dispersive medium 152 must be a phase conjugate of the medium 148 used to construct the hologram. The orthoscopic image 154 appears to the observer to be behind the dispersive medium 152.

It may be observed that the technique of producing an orthoscopic image 154 according to FIGS. 10a and 10b is similar to the technique of producing a pseudoscopic image 11a according to the techniques of FIGS. 4a and 4b, but there are important distinctions. A hologram constructed according to either FIG. 4a or FIG. 10a will produce two image bearing wave fronts when reconstructed. In FIG. 4b, the first order diffracted beam carrying information of a pseudoscopic image results from reconstruction by a light beam that is the conjugate of the reference light beam used to construct the hologram and is incident upon the opposite side of the hologram than was the reference beam. The same dispersive medium 25 which was used in constructing the hologram may be used in its reconstruction. In reconstructing a hologram according to FIG. 10b, the first order diffracted beam carrying information as to the orthoscopic image results from a conjugate beam incident upon the same side of the hologram as was the reference beam and requires a dispersive medium which is the phase conjugate of the medium used during the hologram construction. Furthermore, in obtaining an orthoscopic image 154 without severe aberrations, the dispersive mediums 148 and 152 must be curved, a problem not encountered to obtain an unaberrated pseudoscopic image 11a according to the method of FIGS. 4a and 4b.

The three examples hereinabove described showing possible techniques for reconstructing an orthoscopic image of an object according to this invention have been described with reference to dispersion mediums of the transmissive type, but it should be understood that reflected dispersion mediums may also be used in the same manner with equal success.

The use of a dispersion medium interposed between the object and the hologram has been described with particularity for reducing the space-spatial frequency product of the information recorded on the hologram but it should be noted that such a dispersion medium also may act as a coding plate in television or movie systems wherein images may be reconstructed only upon knowledge of the dispersion medium used in constructing the hologram. Such a system has commercial application where the image viewer is given a matched dispersion medium or a conjugate thereof for use in reconstructing images only upon payment of a subscription fee. In such systems, the techniques hereinabove described for reconstructing substantially unaberrated and undistorted orthoscopic images instead of pseudoscopic ones has application of great utility and may even be used with a large variety of various coding plates other than the dispersive mediums described herein.

Random dispersion mediums are found in existence for other optical applications and, thereby, may easily be adapted for use in the present invention. However, under certain circumstances a dispersion medium which retards the phase of light in a periodic manner across the surface of the medium is preferred. A primary advantage of a periodically varying phase structure is that it is easier to align during reconstruction with its image for decoding the signal.

Furthermore, a periodic phase structure allows elimination of a spotty background in the image which is characteristic to some degree of the use of dispersive mediums as herein. A random dispersion structure has a random spotty background in the image which may be minimized by moving the dispersive medium and the hologram during reconstruction of an image in a rapid and random manner. However, a periodic structure allows elimination of the spotty background upon vibrating the dispersive medium and the hologram upon reconstruction in a square or other predetermined periodic pattern which spreads out the apparent image of the spots to blur them into a background of uniform intensity.

Figure 11:
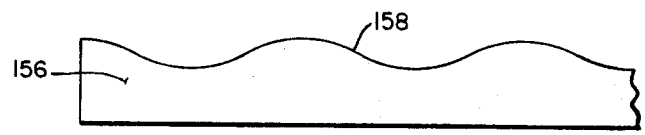
FIG. 11 shows an enlarged cross section of another example dispersion plate.

An example of a periodic phase structure is shown in FIG. 11 wherein a sheet of glass 156, or other light refracting medium, which has had a surface 158 formed by etching or some other process into a sinusoidal function. Such a sinusoidal varying surface gives good results. A more ideal surface is a parabolically varying one but this is more difficult to construct and not too much different from a sinusoidal surface. A parabolic varying surface is preferred because light is refracted equally in all directions. Therefore, there is better intensity distribution across the image.

Another advantage to a parabolic varying periodic surface is that the degree of flatness for a given resolution element size is the same anywhere across the plate, as can be seen by examining the definition equation of a parabola whose second derivative is equal to a constant. The result is a reconstructed image with the same degree of resolution throughout.

Although the invention has been described with respect to specific embodiments, the underlying principle of the invention will suggest several modifications of the specific embodiments to those skilled in the art. It is, therefore, intended that the invention not be limited to the specific embodiments described but rather should be given the full range of protection as falls within the spirit and scope of the appended claims.

What is claimed is:

1. A method of holographically recording a coherent radiation wave front emanating from an object field, comprising the steps of:
   dispersing said radiation wave front across a surface area of finite dimensions that is located a first distance from said object field in the path of said wave front, whereby said surface area dimensions and said first distance determine a field of view of said object field through said surface area,
   positioning a hologram detector in the path of the dispersed radiation wave front at a surface located a second distance from said dispersing surface, said first distance multiplied by a dimension across said detecting surface in at least one direction being maintained less than said second distance multiplied by a dimension across said object field in said at least one direction, and
   directing onto said hologram detector to interfere with the dispersed radiation wave front a reference radiation wave front mutually coherent with the radiation wave front emanating from the object field, said reference radiation wave front striking the hologram detector at a finite angle with the dispersed radiation wave front,
   whereby an off-axis hologram is formed on the hologram detector with a lower space-spatial frequency product than would result if a hologram detector were positioned coincident with said dispersing surface, said hologram additionally being capable of reconstructing an image of said object field with said field of view as determined by the dispersing surface area dimensions and the first distance.

2. A method of holographically recording a coherent object modified radiation beam from an object field, comprising the steps of:
   dispersing the object modified radiation beam across a surface area of fixed finite dimensions located a distance from the object field in the path of said object modified radiation beam, whereby the fixed dimensions of said surface area and said distance determine a field of view of said object field through said surface area,
   locating a hologram detector of fixed dimensions in the path of said dispersed object modified beam a distance from said dispersing surface, and
   directing a reference beam mutually coherent with said object modified beam against the hologram detector at a finite angle with said dispersed object modified beam, thereby to produce an interference pattern that is recorded as an off-axis hologram on said detector,
   said distance between the object field and said dispersing surface, said distance between the dispersing surface and the hologram detector, said fixed dimensions of the dispersing surface, said fixed dimensions of the hologram detector and dimensions of the object field all having relative values so that the maximum angle between any dispersed rays striking some point of the detector when multiplied by a distance across said detector in at least one direction is less than a maximum angle between any of the object modified beam rays striking some point of the dispersing surface when multiplied by a distance across said dispersive surface in said at least one direction,
   whereby the off-axis hologram is capable of reconstructing an image of the object field with said field of view, said off-axis hologram also having reduced data content in comparison with a hologram constructed by positioning a hologram detector coincident with said dispersing surface area.

3. The method as defined in claim 2 wherein the step of dispersing the object modified radiation beam emanating from an object field across a surface thereof consists of retarding the relative phase of the wave front of said object modified radiation beam according to a given relative phase function across said beam.

4. The method as defined in claim 3 wherein said given relative phase function is a random one.

5. The method as defined in claim 3 wherein said given relative phase function is a periodically recurring one.

6. The method as defined in claim 2 wherein the step of dispersing the object modified radiation beam includes altering the relative phase of the wave front of said object modified radiation beam according to periodically recurring relative phase function across said dispersing surface area.

7. The method as defined in claim 2 wherein said object field includes another hologram, said coherent object modified radiation beam being reconstructed from said another hologram.

8. The method as defined in claim 2 wherein said coherent object modified beam rays are dispersed by positioning a transmissive dispersion medium at said dispersing surface.

9. The method as defined in claim 2 wherein said coherent object modified beam rays are dispersed by positioning a reflective dispersion medium at said dispersing surface.

10. The method as defined in claim 2 wherein a dispersion medium of radiation refracting material is positioned coincident with said dispersing surface, said dispersion medium characterized by having surface undulations for imparting a relative phase change across said coherent object modified radiation beam, substantially all of said undulations having slopes that are approximately constant over a distance substantially equal to a product of the wavelength of the coherent radiation and a distance between said dispersive surface and said detector when this product is divided by the refractive index of said dispersive medium, whereby a reduction of hologram data content is accomplished by reducing resolution of a reconstructed image rather than increasing the background noise of a reconstructed image.

11. The method as defined in claim 2 wherein the step of dispersing said coherent radiation wave front across a surface thereof includes positioning coincident with said surface area a dispersion medium having a roughened surface, thereby imparting a relative phase variation across said wave front.

12. A system for holographically recording a coherent object modified radiation beam from an object field, comprising,
  a dispersive medium of fixed dimensions positioned in the path of said object modified beam a distance from said object field, whereby to form a dispersed object modified beam, whereby a surface area of said dispersive medium and said distance from the object field determine a field of view of said object field through said surface area,
  a hologram detector of fixed dimensions positioned in the path of said dispersed object modified beam a distance from said dispersive medium, and
  means for directing a reference beam mutually coherent with said object modified beam against the hologram detector at a finite angle with said dispersed object modified beam, thereby to produce an interference pattern that is recorded as an off-axis hologram on said detector,
  said distance between the object field and said dispersive medium, said distance between the dispersive medium and the hologram detector, said fixed dimensions of the dispersive medium, said fixed dimensions of the hologram detector and dimensions of the object field all having relative values so that the maximum angle between any dispersed rays striking some point of the hologram detector when multiplied by a distance across said detector in at least one direction is less than a maximum angle between any of the object modified beam rays striking some point of the dispersive medium when multiplied by a distance across said dispersive medium in said at least one direction,
  whereby said system constructs an off-axis hologram with reduced data content and a capability of reconstructing an image of the object field with said field of view.

13. A system according to claim 12 wherein said dispersive medium is a diffusion screen having a randomly roughened surface.

14. A system according to claim 12 wherein said dispersive medium includes a substantially transparent refractive sheet material with periodically varying surface undulations on one side thereof.

15. A system according to claim 14 wherein said periodically varying surface undulations have a sinusoidal shape.

16. A system according to claim 14 wherein said periodically varying surface undulations have a parabolic shape.

17. A system according to claim 12 wherein said dispersive medium includes a substantially transparent refractive sheet material with surface undulations on one side thereof for imparting a relative phase change across said object modified radiation beam, substantially all of said undulations having slopes that are approximately constant over a distance substantially equal to a product of the wavelength of the coherent radiation and a distance between the dispersive medium and said detector when this product is divided by the refractive index of said dispersive medium, whereby a reduction of hologram data content is accomplished by reducing resolution of a reconstructed image rather than increasing the background noise of a reconstructed image.

18. A method of holographically recording and reconstructing a coherent information carrying radiation beam originating from an object field, comprising the steps of:
  positioning a first dispersive medium of fixed surface area dimensions a distance from the object field in the path of the information carrying radiation beam, whereby said dimensions and said distance determine a field of view of said object field through said surface area, thereby dispersing information carrying radiation beam rays into scattered rays of a dispersed information carrying beam,
  locating a hologram detector of fixed dimensions in the path of said dispersed information carrying beam a distance from said dispersive medium,
  directing a reference beam having a certain wave front curvature and mutually coherent with said information carrying beam against the hologram detector at a finite angle with said dispersed information carrying beam, thereby to produce an interference pattern that is recorded as an off-axis hologram on said detector,
  said distance between the object field and said dispersive medium, said distance between the dispersive medium and the hologram detector, said fixed dimensions of the dispersive medium, said fixed dimensions of the hologram detector and dimensions of the object field all having relative values so that the maximum angle between any dispersed rays striking some point of the detector when multiplied by a distance across said detector in at least one direction is less than a maximum angle between any of the information carrying beam rays striking some point of the dispersing surface when multiplied by a distance across said dispersive medium in said at least one direction, whereby a hologram is constructed with reduced data content in comparison with a hologram constructed by positioning a hologram detector coincident with said dispersing surface,
  illuminating said hologram with coherent reconstructing radiation so that a portion thereof is diffracted into at least one first order wave front in which an image of said dispersive medium is formed in real space, and
  positioning a second dispersive medium in said at least one first order diffracted wave front coincident with an image of said first dispersive medium, said second dispersive medium having characteristics related to those of said first dispersive medium so that a replica of said information carrying radiation beam is produced in which an image of said object field is formed, whereby said object field image is reconstructed from said hologram with said field of view.

19. The method as defined in claim 18 in which said object field is an off-axis hologram of a physical object, said information carrying radiation beam recorded on the data-reduced hologram is a pseudoscopic image carrying first order diffracted wave front of said off-axis hologram, and said second dispersive medium has a relative phase function thereacross that is the same as that of the first dispersive medium.

20. The method as defined in claim 18 wherein the step of illuminating the data-reduced hologram is accomplished so that said at least one first order reconstructed wave front forms an orthoscopic image of the first dispersive medium, and further wherein the first and second dispersive media used to construct the data-reduced hologram and reconstruct an image therefrom are phase conjugates of each other.

21. The method as defined in claim 20 wherein said first and second dispersive mediums are each spherical in surface shape and positioned with their centers of curvature at approximately the center of the hologram.

22. The method as defined in claim 18 wherein the step of illuminating said hologram includes directing said coherent reconstructing radiation against an opposite side of the hologram from a side thereof exposed to the dispersed information carrying and reference radiation wave fronts during construction of the data-reduced hologram, said reconstructing radiation being of substantially the same frequency as said reference radiation and additionally having a wave front of substantially opposite curvature to that of said reference radiation, whereby a pseudoscopic image of the first dispersive medium is formed in real space directly from said hologram, and further wherein the second dispersive medium positioned coincident with said pseudoscopic image of the first dispersive medium has a phase function thereacross that is substantially identical with that of the first dispersive medium.

23. The method as defined in claim 20 wherein the step of illuminating said data-reduced hologram includes directing said coherent reconstructing wave front against the same side of the hologram that was exposed to the dispersed information carrying and reference radiation wave fronts during construction of the hologram, said reconstructing radiation being of substantially the same frequency as said reference radiation and additionally having a wave front of substantially the same curvature as that of said reference radiation, whereby an orthoscopic image of said first dispersive medium is generated in virtual space behind the hologram, and wherein the step of illuminating said data-reduced hologram further includes transferring said orthoscopic image from virtual into real space by an optical system, whereby the second dispersive medium is positioned coincident with the real space orthoscopic image of the first dispersive medium.

24. The method as defined in claim 21 wherein the step of illuminating said hologram includes directing said coherent reconstructing wave front against the same side of the hologram that was exposed to the dispersed information carrying and reference radiation wave fronts during construction of the hologram, said reconstructing radiation being of substantially the same frequency as said reference radiation and additionally having a wave front of substantially opposite curvature to that of said reference radiation, whereby an orthoscopic image of said first dispersive medium is formed in real space and said second dispersive medium is positioned coincident therewith.

25. For an off-axis hologram that has been constructed according to the steps of dispersing information bearing radiation wave front across a surface thereof according to a given relative phase function, positioning a hologram detector in the path of the dispersed information bearing radiation wave front and directing toward said detector for interference with the dispersed information bearing radiation wave front a reference radiation wave front mutually coherent with said information bearing radiation wave front, a method of reconstructing a replica of the information bearing radiation wave front from said hologram comprising the steps of:

reconstructing from said hologram an actual dispersed information bearing radiation wave front as opposed to a conjugate dispersed information bearing wave front, said reconstructed actual dispersed information bearing radiation wave front forming in real space an actual image of said dispersing surface, and dispersing according to a phase conjugate of said given relative phase function the reconstructed actual dispersed information bearing radiation wave front across a surface thereof in which said actual dispersing surface image is formed, thereby forming a replica of the actual information bearing radiation wave front.

26. The method as defined in claim 25 wherein the step of reconstructing from said hologram an actual dispersed information bearing radiation wave front includes imaging with the use of at least one lens a virtual image of said dispersion phase function into real space.

27. The method as defined in claim 26 wherein the step of reconstructing from said hologram an actual dispersed information radiation wave front additionally includes illuminating said hologram with coherent reconstructing radiation having substantially the same frequency, wave front curvature and angle of incidence against the hologram as the reference radiation wave front used in constructing the hologram.

28. The method as defined in claim 27 wherein the step of dispersing an information bearing wave front includes placing in the path of travel of said wave front a dispersion medium having substantially a spherical surface with a center of curvature substantially coincident with a center of said hologram detecting surface.

29. The method as defined in claim 28 wherein the step of reconstructing from said hologram an actual dispersed information bearing radiation wave front includes illuminating said hologram with coherent reconstructing radiation having substantially the same frequency and a wave front curvature that is opposite to that of the reference radiation wave front used in constructing the hologram.

30. The method as defined in claim 25 wherein said given phase function is a periodically recurring function.

* * * * *